Oct. 28, 1952     F. S. RANZ     2,615,384
AUTOMATIC BEVERAGE MAKER

Filed June 30, 1949     2 SHEETS—SHEET 1

INVENTOR
FRANK S. RANZ
by Toulmin & Toulmin
ATTORNEYS

Oct. 28, 1952        F. S. RANZ        2,615,384
AUTOMATIC BEVERAGE MAKER

Filed June 30, 1949        2 SHEETS—SHEET 2

INVENTOR
FRANK S. RANZ by     *Toulmin & Toulmin*
ATTORNEYS

Patented Oct. 28, 1952

2,615,384

UNITED STATES PATENT OFFICE 2,615,384

AUTOMATIC BEVERAGE MAKER

Frank S. Ranz, Blue Ash, Ohio

Application June 30, 1949, Serial No. 102,249

9 Claims. (Cl. 99—282)

This invention relates to devices for making beverages, and particularly to automatic devices of this nature. One of the primary objects of this invention is to provide an automatic beverage maker especially adapted for mounting in an automotive vehicle or truck, and which will automatically make and dispense a predetermined amount of beverage whenever it is operated.

Another object is the provision of an automatic beverage maker and dispenser which is simply constructed and which will operate automatically when actuated to make and dispense a predetermined quantity of hot beverage.

Another object is the provision of a unit for automatically making and dispensing beverages which is adapted for being installed in tourist cabins, hotel rooms, restaurants, and in the home.

A still further object is the provision of a coin operated control device in connection with the automatic beverage maker of this invention, such that a coin of a predetermined denomination must be placed in the device before the dispenser can be actuated.

It is also an object to provide a device of the nature described, which is operable automatically for measuring out a predetermined amount of water, for heating the water, and, when heated, for discharging it over material, which will react therewith to make a beverage.

These and other objects and advantages will become more apparent upon reference to the following description taken in connection with the accompanying drawings, in which.

Figure 1:
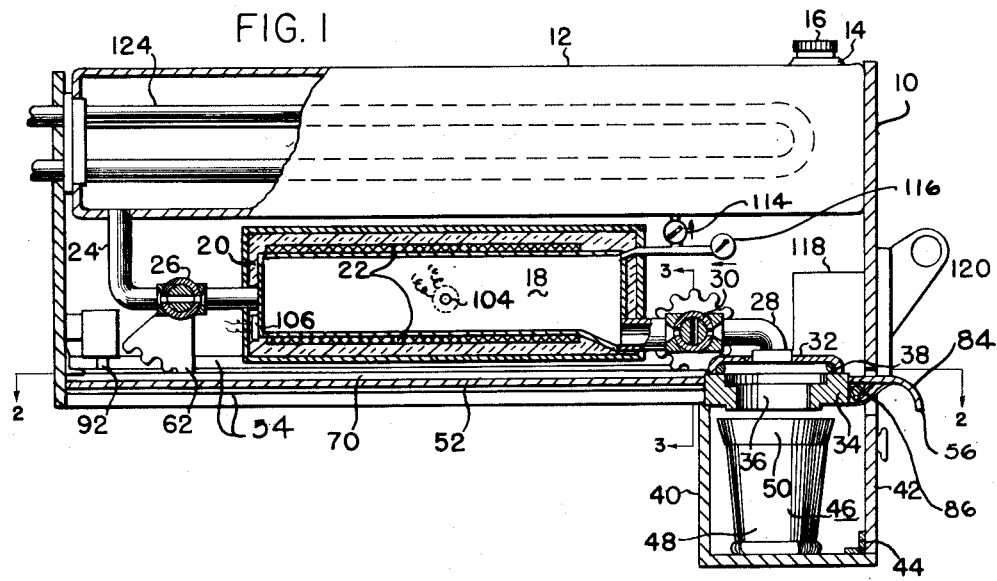
Figure 1 is a side view partly in section of a device constructed according to my invention.

The device according to my invention comprises, generally, a source of water, such as a reservoir, a heating chamber of a predetermined size connected therewith, and a station through which the heated liquid passes from the heating chamber, and in which station the heated liquid acts on a charge of beverage making material to make the desired beverage. A suitable receptacle, such as a cup, is positioned to receive the beverage from the said station and is located so as to be accessible after the beverage has been made.

Referring to the drawings somewhat more in detail, the form which my invention takes therein comprises a frame part generally indicated at 10, and in which is mounted a reservoir 12 of a predetermined size and having a filling opening 14 closed by a cap 16. The reservoir 12 may vary in size, but for an automotive installation such as a car or truck, it will probably be on the order of half-gallon in capacity.

Located beneath reservoir 12 is a heating chamber 18 which may be a double-walled tank having a layer of insulation 20 between its inner and outer walls. Chamber 18 also has associated therewith, heating means such as the electric element indicated at 22 and which may be wrapped around the chamber as shown, or may be of the immersion type. Individual preferences and cost of manufacture will indicate which type of heating means is to be preferred.

A conduit 24 connects reservoir 12 with heating chamber 18 and a valve 26 in conduit 24 controls the flow of fluid from reservoir 12 into the said chamber.

At the end of chamber 18 opposite its connection with conduit 24, there is a discharge conduit 28 opening off the bottom part of the end wall of chamber 18. Conduit 28 also has a control valve 30 therein, similar to valve 26 in conduit 24.

The discharge end of conduit 28 terminates in a somewhat enlarged circular fitting 32 which overlies a member 34 having a shouldered bore 36 extending therethrough. Fitting 32 preferably includes an annular sealing ring such as ring 38, which seals against the top surface of member 34 and insures that all the hot liquid being discharged from conduit 28 will pass through shouldered bore 36. As will be seen hereinafter, shouldered bore 36 is adapted for receiving a cartridge or capsule containing material which, when acted upon by hot water, will make a beverage such as coffee, tea or chocolate.

Frame 10 has a box-like enclosure 40 suspended therefrom beneath member 34, and a door 42 hinged at 44 permits access to the compartment from the front of the device. This compartment is useful for receiving and supporting a receptacle 46 into which the beverage passes from member 34. Receptacle 46 may comprise, as shown, a metal outer container 48 adapted for receiving a paper liner 50.

Figure 2:
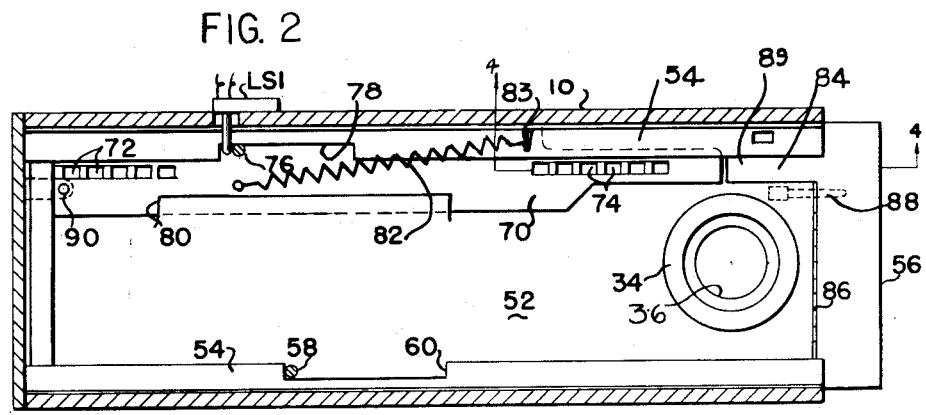
Figure 2 is a plan section indicated by line 2—2 on Figure 1.
Figure 3:
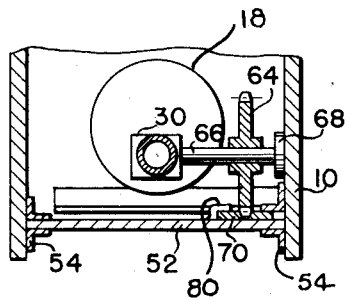
Figure 3 is a vertical transverse section indicated by line 3—3 on Figure 1.

As will best be seen in Figures 1, 2 and 3, member 34 is mounted on a slide plate 52 which is guided within frame 10 as by the angle members 54 so as to be reciprocable longitudinally of the device. Preferably, slide plate 52 has at its outer end, a handle 56 which may comprise a turned-down end part of the said slide. A stop pin 58 in the slide moves in a notch 60 in one of the guide members 54, and predetermines the inner and outer limits of movement of slide plate 52 for a purpose which will become more apparent hereinafter.

Slide plate 52 in its innermost position, aligns member 34 with fitting 32 in order properly to locate the beverage charge for being acted upon by hot water, and when in its outer position, positions member 34 externally of frame 10 of the device so the exhausted cartridge can be removed from member 34 and a new cartridge placed therein.

Referring now to valves 26 and 30, it will be seen that valve 26 is adapted for actuation between its open and closed positions by means of a gear segment 62 mounted integrally with the movable valve member of valve 26. Similarly, the movable valve member of valve 30 has mounted therewith a gear 64 so the valve can be actuated between its open and closed positions. The manner of connecting the gear segment 62 and the gear 64 to their respective valve members is shown in Figure 3, which is a vertical section taken through valve 30. In this figure it will be noted that the valve member of the valve includes an actuating shaft 66 extending into the valve and through the actuating gear therefor, and having an outboard bearing 68 mounted on the side wall of frame 10.

Gear segment 62 and gear 64 are connected together by a secondary slide 70 having apertures 72 therein for engagement with the teeth of gear segment 62, and apertures 74 for engagement with the teeth of gear 64. It will be apparent that reciprocation of secondary slide 70 will alternately open and close valves 26 and 30. As will be seen in Figure 1, the slide 70 and the gear segments 62 and gear 64 are so arranged that when slide 70 is in its extreme left-hand position, valve 26 is open, while valve 30 is closed. When the slide is in its right-hand position, opposite conditions obtain, and valve 26 is closed and valve 30 is open. The limits of movement of slide 70 may be determined by a stop pin 76 thereon that moves in a notch 78 in one of the guide members 54. Inasmuch as slide 70 is relatively narrow, as will be seen in Figure 2, it preferably receives some guiding support from main slide 52, as by means of the elongated tab 80 on slide 52 which overlies one edge of secondary slide 70.

A spring 82 is connected between slide 70 and a suitable point on frame 10, as at 83, and continuously urges slide 70 rightwardly and is of sufficient strength to move the said slide together with the actuating members 62 and 64 of valves 26 and 30.

Figure 4:
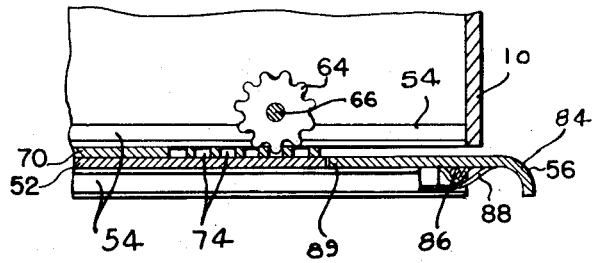
Figure 4 is a longitudinal section indicated by line 4—4 on Figure 2.

Slide 70 is adapted for actuation in its leftward direction by means of a latch plate 84 pivoted to slide 52, as at 86, and normally urged by leaf spring 88 into position where it will not engage slide 70. This latch plate may be a small element set in the end of slide 52, or may be, as shown, the entire end part of the said slide having the extension part 89 for engagement with the end of slide 70. This arrangement may be seen in Figure 4, and it will be evident that by depressing the end of plate 84 adjacent the handle 56, the other end of the said plate will be raised to position where it will engage the end of slide 70. Thus, when slide 52 is pulled outwardly to introduce a new cartridge of beverage making material therein, when it is pushed back into position shown in Figures 1 and 2, plate 84 can be actuated so that slide 70 is picked up and moved to its Figures 1 and 2 position.

At its left end, slide 70 has an aperture 90 therein, and this aperture is adapted for receiving a latch member 92 normally urged into position to engage slide 70 by a spring 94, and adapted for being withdrawn from latching engagement with the slide by energization of a solenoid 96.

Figure 5:
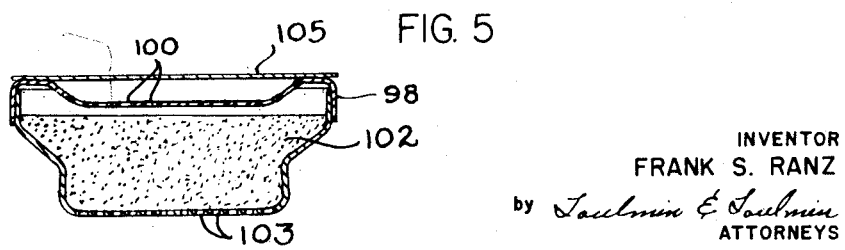
Figure 5 is a sectional view showing a cartridge of beverage making material adapted for use with the device of this invention.

Turning now to Figure 5, this view shows a vertical section through a typical cartridge adapted for being placed in bore 36 of member 34. The cartridge comprises a shell which may be of metal, plastic, paper, or some other suitable substance which can conveniently be worked into shape and has a top closure or cover member 98. The cover member has a recess in the center part thereof with apertures 100 therein, so that the hot water delivered to the cartridge will flow through the said apertures and then through the charge of material 102 contained within the cartridge. The bottom wall of the cartridge is perforated, as at 103, and these perforations are preferably of such a size that the flow of water through a cartridge is controlled and remains in contact with the material contained in the cartridge the proper length of time.

At this point it may be noted that the charge 102 is preferably standard drip-ground coffee, but may also be a dehydrated substance, either of these types of charges being readily acted on by hot water to form a beverage.

The dehydrated substance may be made according to a process where the desired beverage is first brewed or made and then later dehydrated to remove the free water so that cartridges of the nature shown can be made and supplied for use with the device according to this invention. Such dried beverage making materials are well known, and no further disclosure thereof is believed necessary.

In practice, I prefer to arrange a plurality of the cartridges in a tubular container or the like and with a sheet of paper, as indicated at 105, therebetween, and which acts hermetically to seal the units to prevent loss of flavor of the charges therein. The cartridges can be removed from the container singly, and those remaining in the container will remain sealed and fresh.

Figures 6, 7:
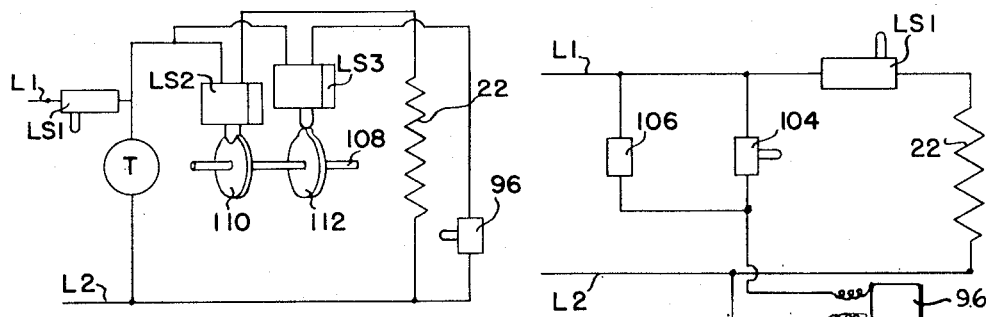
Figure 6 is a diagrammatic layout showing one form of an electric control circuit for this invention.
Figure 7 is a view like Figure 6, but showing a modified form which the control circuit may take.

The electrical circuit shown in Figure 6 is one arrangement for controlling the device of this invention. In Figure 6 the power lines are indicated at L1 and L2 and they comprise wires extending to the battery terminals of an automotive vehicle, truck, or may be connected with a normal house lighting power line. The heating element associated with chamber 18 is indicated at 22 in Figure 6, and the solenoid for withdrawing the latch member 92 is indicated at 96. In series with the heating means 22 is a limit switch LS1, which, as will be seen in Figure 2, is positioned to be engaged and actuated into its closed position by stop pin 76 of slide 70 when said slide is in its left-hand position.

In series with solenoid 96 is a first thermostatic element 104, which extends into chamber 18 and will be seen in Figure 1, and in parallel with thermostatic element 104 is another thermostat 106 mounted on chamber 18, as shown in Figure 1, and which is responsive to overheating of the chamber if, for any reason, there is no water therein.

It will be evident that as soon as switch LS1 is closed by pin 76, heating means 22 will be energized, and that it will remain energized until LS1 is again opened by the rightward movement of slide 70 and pin 76 when the said slide is released by the withdrawing of the latch member 92. Withdrawing of latch member 92 is accomplished by the closing of one of thermostats 104 and 106, thereby to energize the latch member withdrawing solenoid 96.

In Figure 7 there is shown an arrangement similar to that illustrated in Figure 6, except that Figure 7 is a timer controlled arrangement. In this figure LS1 is connected for energizing timer T when slide 70 is moved into its left-hand position. Timer T, in turn, drives a shaft 108 mounting cams 110 and 112. Cam 110 controls a switch LS2 in series with heating element 22, whereas cam 112 controls a switch LS3 in series with latch member solenoid 96.

It will be apparent that as soon as timer T commences to rotate, switch LS2 will close to energize the heating element, whereas switch LS3 will open and de-energize the latch solenoid. Thereafter, when shaft 108 has made one complete revolution, switch LS2 will open to de-energize heating element 22, while switch LS3 closes again to energize latch member solenoid 96, thus withdrawing the latch member and releasing slide 70 so that it moves rightwardly and permits opening of switch LS1. Opening of switch LS1, of course, will maintain timer T de-energized until slide 70 is again moved into its left-hand position.

*Operation*

In operation, assuming reservoir 12 to contain water, the operator places a cartridge in bore 36 while slide 52 is in its outer position. This cartridge, of course, has the cover member 100 stripped therefrom. The operator then lifts the rear end of latch plate 84 by depressing the outer end thereof, and pushes slide plate 52 inwardly. Due to engagement of latch plate 84 therewith, secondary slide 70 will move with slide 52 into the position it occupies in Figure 2. This movement of slide 70 will be accompanied by closing of valve 30 and opening of valve 26, so that water will commence to flow from reservoir 12 into heating chamber 18. Movement of slide 70 into its left-hand position will also be accompanied by energization of heating means 22, due to the closure of limit switch LS1, in accordance with whichever one of the control circuits of Figures 6 or 7 is being utilized with the device. Also, slide 70 is latched in its left-hand position by latch member 92.

When the water in chamber 18 reaches a predetermined temperature, thermostatic element 104 will bring about releasing of slide 70 so that spring 82 will move it rightwardly to its right-hand position. This last movement of slide 70 is accompanied by de-energization of heating means 22, opening of valve 30 and closing of valve 26.

At this time, the hot water from chamber 18, and which is of a predetermined volume due to the size of chamber 18, will flow through conduit 28 and then through the cartridge in bore 36 and then into receptacle 46. During the passage of the fluid through the cartridge, it will, of course, dissolve the material therein, so that what is received in receptacle 46, is a fresh hot beverage.

It may be preferable to provide a passage between chamber 18 and reservoir 12 to permit the escape of air from chamber 18 during the filling thereof, and including a check-valve as indicated at 114 in Figure 1. Similarly, when chamber 18 is discharging through conduit 28, it may be desirable to provide a checked passage as at 116, to permit air to flow into the said chamber.

As mentioned before, the device of my invention may be arranged to be coin controlled, and this is more or less diagrammatically illustrated in Figure 1 by the coin device 118 mounted on frame 10 and adapted for receiving a coin in the opening 120. It will be understood, as is well known in the art of coin operated devices, that without a coin in device 118, it locks one or both of the slides against reciprocation, as by means of a latching member adapted for engaging slide 52 through opening 122 in one of the guide members 54. However, when a coin of the proper denomination is placed in opening 120, the latch member is withdrawn and slide 52 can be reciprocated for placing the device into operation.

As has been mentioned before, reservoir 12 comprises any source of water, and in a home, or in a hotel room, or in a tourist cabin, it may comprise a water line connected with the regular water system. For an automotive installation, a reservoir 12 will be supplied as shown, and under these circumstances, it may be desirable to preheat the water in the reservoir to reduce to a minimum, the amount of energy which must be supplied to heating means 22. This pre-heating means may comprise a coil or similar unit 124 connected with the engine of the vehicle to provide for an exchange of heat between the said engine and the water of said reservoir 12. For example coil 124 could be connected to pass the cooling water of the vehicle engine similarly to an ordinary car heater.

It will be apparent that a number of modifications could be made in the device, in order to adapt it to different uses and circumstances, and accordingly, it is desired to comprehend of such modifications and adaptations as come within the scope of the appended claims.

I claim:

1. In combination; a reservoir, a heating chamber having an inlet connected to said reservoir and also having an outlet, valves in said inlet and outlet and operating arms therefor comprising teeth, a slide having means engaging said teeth and a spring urging said slide toward a first position where the inlet valve is closed and the outlet valve is open, said slide being movable into a second position where said inlet valve is open and said outlet valve is closed, a latch engageable with the slide in its second position, a switch positioned to be closed by the slide in its second position, heating means for the tank adapted for being energized by closure of said switch, means responsive to the elapse of a predetermined time after movement of said slide into its second position for withdrawing said latch, a member having a passage therethrough and movable from a first position wherein a cartridge of material that will make a beverage when acted on by hot water can be inserted into said passage into a second position wherein said passage is aligned with said outlet, and means selectively operable for connecting said member and slide so movement of said member into its second position will also move said slide into its second position.

2. In combination; a reservoir, a heating chamber having an inlet connected to said reservoir and also having an outlet, valves in said inlet and outlet and operating arms therefor comprising teeth, a slide having means engaging said teeth and a spring urging said slide toward a first position where the inlet valve is closed and the outlet valve is open, said slide being movable into a second position where said inlet valve is open and said outlet valve is closed, a latch engageable with the slide in its second position, a switch positioned to be closed by the slide in its second position, heating means for the tank adapted for being energized by closure of said switch, means responsive to the water in the tank being heated to a predetermined temperature for withdrawing said latch, a member having a passage therethrough and movable from a first position wherein a cartridge of material that will make a beverage when acted on by hot water can be inserted into said passage into a second position wherein said passage is aligned with said outlet, and means selectively operable for connecting said member and slide so movement of said member into its second position will also move said slide into its second position.

3. In a beverage making device; a frame, a tank in the frame having a valved inlet, a valved outlet, and heating means; a member movable in the frame having one position wherein it is adapted to receive and support a cartridge containing material which will make a beverage when acted on by hot water, said member being movable into a second position wherein said cartridge is positioned beneath said outlet; means connecting said member and valves responsive to movement of said member into its second position for closing the valve in said outlet and for opening the valve in said inlet, other means on said member for energizing said heating means in response to movement of the member to its second position; and means operable automatically after heating of the water in the tank for de-energizing said heating means and for closing the valve in said inlet and for opening the valve in said outlet.

4. In a beverage making device; a heating tank having an inlet valve and an outlet valve and heating means, said valves being interconnected so closing of either will open the other, said valves being biased toward a first position wherein said inlet valve is closed, a first member connected to said valves for moving said valves against said bias into a second position wherein said outlet valve is closed and means for retaining them in that position, means for energizing said heating means in response to movement of said valves into said second position, means operable automatically a predetermined time after energization of said heating means for releasing said valves from their second position and for de-energizing said heating means, a second member movable from a first position wherein it is adapted for receiving a charge of beverage making material to a second position wherein the said charge aligns with the outlet valve to receive the discharge therefrom, and means for connecting said members for movement to their second positions in unison.

5. In a beverage making device; a heating tank having an inlet valve and an outlet valve and heating means, an actuating member common to both said valves so closing of either will open the other, said valves being biased toward a first position wherein said inlet valve is closed, actuating means for moving said valves against said bias into a second position wherein said outlet valve is closed and latch means for retaining them in that position, means for energizing said heating means in response to movement of said valves into said second position, means operable automatically in response to the water in the tank reaching a predetermined temperature for releasing said valves from their second position and for de-energizing said heating means, a carrier member movable from a first position wherein it is adapted for receiving a charge of beverage making material into a second position wherein the said charge is aligned with said outlet valve to receive the discharge therefrom, and means for causing movement of said carrier member into its second position to move said actuating member to move said valves into their second position.

6. In a beverage maker; a supply reservoir, a heating tank, a channel connecting said reservoir and tank and an inlet valve therein, an outlet port in said tank and an outlet valve controlling the port, heating means for said tank and normally de-energized, a link connecting said valves and spring means biasing said link toward a first position where said inlet valve is closed and said outlet valve is open, said link being movable against the bias of said spring means into a second position where said inlet valve is open and said outlet valve is closed, a latch for engaging said link and retaining it in said second position, a switch positioned to be engaged by said link in its second position to energize said heating means, means responsive to the expiration of a predetermined time from the moment said link is moved into its second position for withdrawing said latch from the link, a member for supporting a charge of beverage making material, said member being movable from a first charging position into a second position wherein the charge is supported in alignment with said outlet, and means responsive to movement of said member into its second position for moving said link into its said second position.

7. In a beverage making device; a frame, a tank in the frame having an outlet, a valve for said outlet, heating means for said tank, an energizing circuit for said heating means including a normally open switch, a carrier member movable in the frame having two positions and adapted in one position manually to receive a cartridge containing material which will make a beverage when acted on by hot water and in its other position to support said cartridge beneath and in alignment with said outlet, an actuating member in the frame connected with said valve, said actuating member being biased toward a first position where said valve is open and being movable to a second position where said valve is closed, means responsive to movement of said actuating member into its second position for closing said switch, a latch for releasably holding said actuating member in its said second position, means for connecting said members together during movement of said carrier member into its said other position and for then disconnecting said members, whereby movement of said carrier member into its said other position will move said actuating member into its said second position and then leave said actuating member free to move to its first position by the action of the said bias thereon when the said latch is released, and means operable automatically after the water in the tank has been heated for releasing said latch.

8. In a beverage making device of the character described; a frame, a tank in the frame having an outlet, a valve for the outlet, heating means for the tank, an energizing circuit for the heating means including a normally open switch, an actuating member in said frame connected with the valve and biased toward a first position where the valve is open, said actuating member being movable into a second position where the valve is closed, means responsive to movement of said actuating member into its second position for closing said switch, a latch engageable with said actuating member for releasably retaining it in its second position, a carrier member movable in the frame and having a first position wherein it is adapted manually to receive a cartridge containing beverage making material, said carrier member having a second position wherein it supports said cartridge beneath and in alignment with said outlet, said carrier member and said actuating member being adjacent each other and being movable in the same direction between their two positions, and manually operable means for connecting said carrier member with said actuating member for movement of said actuating member into its second position in response to the movement of said carrier member into its second position, said manually operable means thereafter releasing said members from each other, whereby withdrawing of said latch will permit movement of said actuating member independently of said carrier member.

9. In a beverage making device of the character described: a frame, a tank in the frame having an outlet, a valve for the outlet, heating means for the tank, an energizing circuit for the heating means including a normally open switch, an actuating member in said frame connected with the valve and biased toward a first position where the valve is open, said actuating member being movable into a second position where the valve is closed, means responsive to movement of said actuating member into its second position for closing said switch, a latch engageable with said actuating member for releasably retaining it in its second position, a carrier member movable in the frame and having a first position wherein it is adapted manually to receive a cartridge containing beverage making material, said carrier member having a second position wherein it supports said cartridge beneath and in alignment with said outlet, said carrier member and said actuating member being adjacent each other and being movable in the same direction between their two positions, manually operable means for connecting said members whereby movement of said carrier member from its one position into its second position will move said actuating member from its first position into its second position, said manually operable means thereafter disconnecting said members for independent movement, and means operable when the water in said tank is heated for withdrawing said latch from operative engagement with said actuating member whereby said heating means is automatically de-energized and the said valve is automatically opened.

FRANK S. RANZ.

REFERENCES CITED

The following references are of record in the file of this patent:

UNITED STATES PATENTS

| Number | Name | Date |
|---|---|---|
| 965,724 | Monewse | July 26, 1910 |
| 1,010,721 | Brown | Dec. 5, 1911 |
| 1,804,795 | Lee | May 12, 1931 |
| 1,809,899 | Heroy | June 16, 1931 |
| 1,822,433 | Brand | Sept. 8, 1931 |
| 1,882,247 | Levings | Oct. 11, 1932 |
| 1,903,519 | Snider | Apr. 11, 1933 |
| 1,952,915 | Evleth | Mar. 27, 1934 |
| 1,977,454 | Price | Oct. 16, 1934 |
| 2,012,645 | Thomas | Aug. 27, 1935 |
| 2,014,325 | Grilli | Sept. 10, 1935 |
| 2,210,126 | Risien et al. | Aug. 6, 1940 |
| 2,243,895 | Brown | June 3, 1941 |
| 2,264,837 | Gavin et al. | Dec. 2, 1941 |
| 2,283,967 | Brown | May 26, 1942 |
| 2,292,101 | Brown | Aug. 4, 1942 |
| 2,452,933 | Joppich et al. | Nov. 2, 1948 |
| 2,484,054 | Sharp | Oct. 11, 1949 |
| 2,493,932 | Swanson | Jan. 10, 1950 |

FOREIGN PATENTS

| Number | Country | Date |
|---|---|---|
| 12,197 | Great Britain | 1890 |
| 18,541 | France | Feb. 16, 1914 |
| 289,689 | Great Britain | May 3, 1928 |
| 686,482 | Germany | Jan. 10, 1940 |